United States Patent Office 3,513,091
Patented May 19, 1970

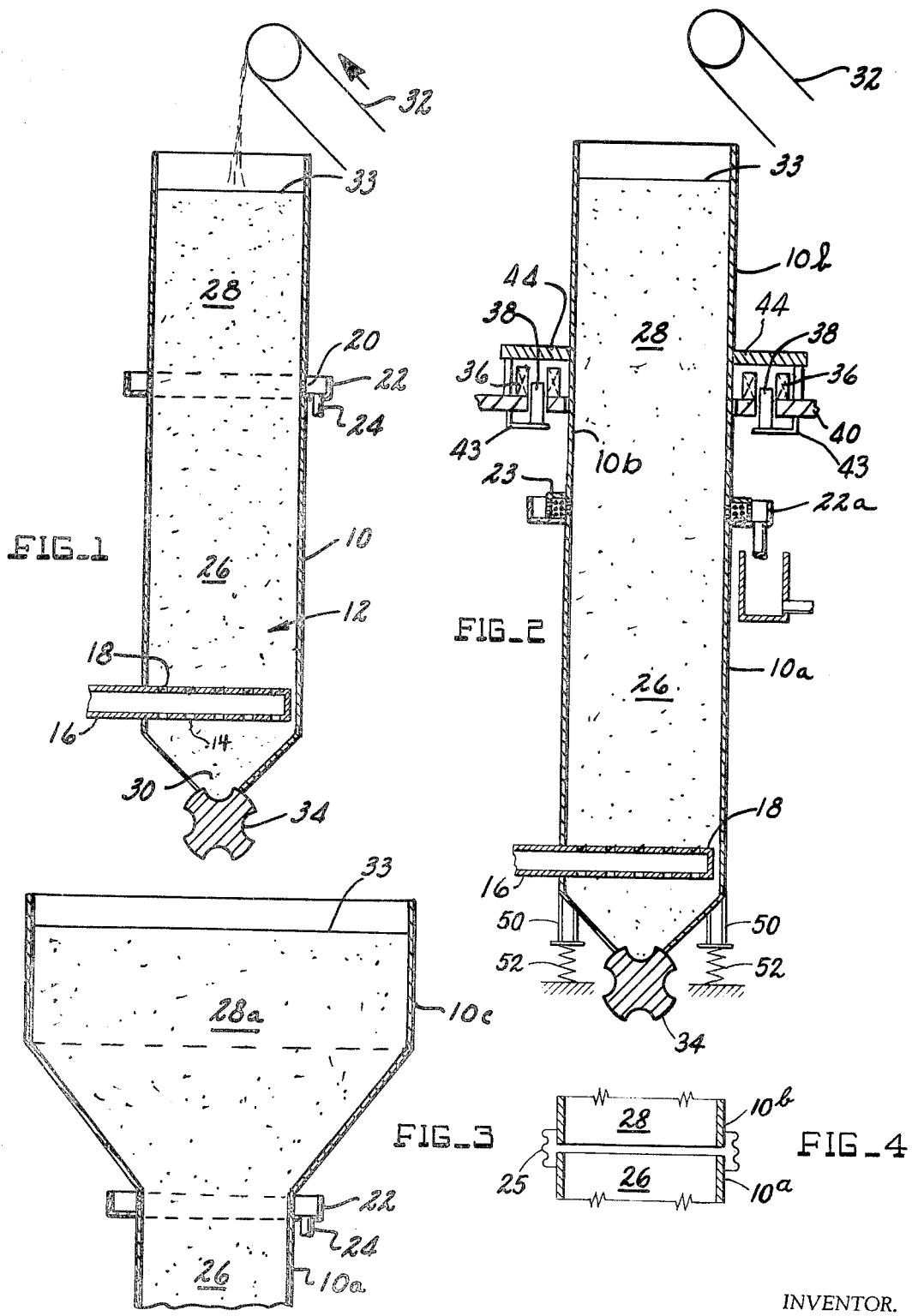

3,513,091
COUNTERCURRENT SOLID-LIQUID CONTACTING SYSTEM
Rowland S. Bevans, Morristown, N.J., assignor to American Standard Inc., New York, N.Y., a corporation of Delaware
Filed Oct. 18, 1967, Ser. No. 676,193
Int. Cl. B01d 33/20
U.S. Cl. 210—19                                19 Claims

ABSTRACT OF THE DISCLOSURE

This invention relates to method and apparatus for passing a liquid to be treated, such as sewage, upwardly through the lower portion of a confined bed of solid, closely packed particles, such as granular or lump coal. The specific improvement is in the means and method for causing the upper portion of the bed to be out of the liquid stream to maintain the operating portion of the bed in a compacted condition.

CROSS-REFERENCES TO RELATED APPLICATIONS

Several other related patent applications are being filed concurrently or substantially concurrently herewith. Those applications are identified as follows: R. S. Bevans, S.N. 676,266, filed Oct. 18, 1967; J. B. Hellmann, S.N. 676,180, filed Oct. 18, 1967; I. J. Kugelman, S.N. 676,192, filed Oct. 18, 1967; and I. J. Kugelman et al., S.N 676,167, filed Oct. 18, 1967.

BACKGROUND OF THE INVENTION

This invention relates to a method and apparatus for continuous countercurrent contact between a liquid stream and a confined bed of closely packed solid particles. It is specifically applicable in the use of a bed of powdered, granular or lump coal for the treatment of sewage and industrial liquid wastes. However the invention should be generally applicable for other countercurrent liquid-solid processes such as filtration of water for municipal or industrial water supply through a bed of sand, or the continuous softening of water with ion exchange resins.

The closest known prior art is U.S. Pat. 3,244,561.

SUMMARY

The invention contemplates apparatus and a method for maintaining a liquid-treatment bed in a compacted condition while permitting downward movement of the bed solids countercurrent to the upflowing liquid; this is accomplished by withdrawing upflowing liquid from the bed before it reached the bed surface, and causing the upper portion of the bed to continually exert a downward pressure on the bed lower portions to prevent fluidization or uplift of the bed. This downward pressure also assists the intermittent or continuous downward movement of the bed solids.

THE DRAWINGS

FIG. 1 is a sectional view taken through an apparatus embodying the invention.

FIG. 2 is a sectional view taken through a second apparatus embodying the invention.

FIG. 3 is a fragmentary sectional view showing a portion of a third apparatus embodying the invention.

FIG. 4 is another fragmentary sectional view showing an alternative apparatus embodying the invention.

FIG. 1 ARRANGEMENT

The FIG. 1 apparatus comprises an upstanding cylindrical vessel 10 for confining a mass of coal particles 12 in a bed formation. Liquid sewage is admitted into the lower portion of the bed through holes 14 directed downward in a pipe 18 extending across the bed and communicating with a liquid inlet supply line 16. The liquid (flowing at an illustrative rate of one-half gallon per minute per square foot of column cross section) flows upwardly through the bed of coal 12 and exits through an annular perforated screen 20 into an annular outlet chamber 22 having a discharge pipe 24. The water is purified by filtration and adsorption processes as it travels upwardly through the bed of coal 12. The bed height, between inlet pipe 18 and outlet chamber 22, may be varied within limits; a height of about 10 feet is believed suitable for sewage treatment applications.

The use of a perforated pipe inlet 18 and an annular outlet chamber 22 is illustrative since other inlet-outlet configurations can be employed in practicing the invention. For example, an annular chamber inlet or a horizontal perforated pipe outlet might be used.

A primary feature of the present invention is the employment of a treatment bed having a materially greater height than the distance between the liquid inlet 18 and liquid outlet 22. Thus, as shown in FIG. 1, the bed comprises a lower zone 26 between inlet 18 and outlet 22, and an upper zone 28 above outlet 22. This upper zone may have a height on the order of 8 to 10 feet when zone 26 has a height of about 10 feet.

The mass of coal particles in zone 28 exerts a downward force on the subjacent particles which tends to compact the bed and prevent fluidization or bed uplifting. The effective portion of the bed between inlet 18 and outlet 22 is thereby maintained in a compacted condition for most advantageous impurity mass transfer with the upwardly flowing liquid.

During service, the bed tends to become clogged with sewage solids, particularly in the sections nearest inlet holes 14. It is therefore desirable to replenish the bed material. In the illustrated apparatus, this may be done on a continuous basis by removing spent material through an exit opening 30 at the lower end of column 10, while adding new material to the upper surface of the bed, as by means of a belt conveyor 32. The objective is to allow the weight of the coal in zone 28 to continuously exert a downward force on the coal in zone 26 for thus forcing coal to escape through the exit opening 30. A rotary valve, or other control valve 34, may be utilized to restrict the escape of coal and keep the amount of liquid leaving with the coal at a relatively small value. Some liquid will escape through opening 30, but the main flow of liquid will be in an upward direction through zone 26.

Conveyor 32 and valve 34 will be operated at rates which maintain a fairly even upper bed surface level 33. There will thus always be some force tending to compact the bed and force the spent material through opening 30. The downward force on zone 26 of the bed can be increased by increasing the height of zone 28 but this effect is limited by frictional forces between the particles and wall 10. Hence, it is preferred to maintain a zone 28 height of at least two bed diameters but there is little advantage to a height of more than four diameters.

Frictional forces between the bed particles, and between the particles and wall 10 tend to interfere with the compaction and coal exhaustion functions. In order to reduce the frictional effect of wall 10, it is preferred to form the bed with zone 26 height which is not more than three or four bed diameters. Since there usually is a minimum required height of zone 26 for a liquid-solid contacting process, this means that there will be a minimum preferred bed diameter and that extremely small diameters should not be used. For example, if a given sewage-coal treatment process requires a ten foot contacting height, a bed diameter of at least two and one half feet is preferred. Larger bed diameters are even more favorable.

Preferably the bed should have a circular cross section to eliminate voids or non-movable coals in confined corner areas. However, if the bed lateral (horizontal) dimension is large enough, other cross sectional shapes, such as hexagonal or square, can be employed. Suitable anti-friction coatings on the wall 10 surfaces could presumably be employed to facilitate coal compaction and coal downflow.

FIG. 2 ARRANGEMENT

The FIG. 2 apparatus is in many respects similar to the FIG. 1 apparatus, and similar reference numerals are utilized where applicable. In the FIG. 2 arrangement, the liquid outlet chamber 22a may be equipped with a small annular bed of coarse filtering media 23 different from the coal media constituting the treatment bed. The purpose of this second small bed is merely to assure that fine particles of coal do not leave with the outgoing liquid.

In FIG. 2 the confining vessel is supported on flexible mounts 50 which leave it free to vibrate in a vertical direction. The purpose of such vertical vibrations is to assist in the compaction of the coal particles by reducing the effects of particle-to-particle and particle-to-wall friction. The inertia of the coal particles will tend to prevent them from following the rapid vertical accelerations and decelerations of the vessel wall, thereby aiding them in slipping downward. The vibratory action may be attained by solenoid vibrators, illustratively shown schematically to include electro-magnetic coils 36 and armatures 38, the coils being mounted on stationary surfaces 40 and the armatures 38 normally resting on stationary surfaces 43. When the coils 36 are energized, the armatures 38 are moved vertically upwardly to apply pressure to and raise the surfaces 44 which are permanently affixed to, and extend outwardly from vessel section 10b. Suitable springs 52 may be used to cushionably support vessel 10 for vertical oscillatory motion. It will be understood that when the coils 36 are energized, the vessel section 10 is caused to vibrate in a vertical direction to effect the desired downward force on the particles in bed zone 26 and 28.

In lieu of the illustrated solenoid vibrators, it should be possible to utilize motor-driven cams acting on the arms 44 to vibrate vessel 10. The cam mechanisms might advantageously be configured to cause a rapid upward movement of vessel 10 and a comparatively slow downward movement. This would tend to hinder the coal particles from moving upward with the vessel during the upstroke but would allow them to move downward with the vessel during the downstroke. There would thus tend to be a compaction action during each vessel vibration cycle. In some cases, it may be preferred to vibrate only the upper zone 28 of the bed if vibrations in the liquid contacting zone 26 cause deleterious effects such as too much compaction of the coal particles around the liquid inlet 18 or the spent solid discharge opening 30. This can be accomplished by separating the vessel into two sections joined together by a suitable flexible joint, as is shown in partial section in FIG. 4.

FIG. 3 ARRANGEMENT

In the FIG. 3 arrangement the confining vessel is formed with a relatively small diameter lower section 10a and a relatively large diameter section 10c. With such dimensioning, the frictional force of the wall on the particles of upper zone 28a is appreciably reduced and the particles in zone 28a exert a greater total downward force on the particles in zone 26 than with the arrangement of FIG. 1. The greater cross section of zone 28a is also beneficial in making the process less sensitive to matching the instantaneous rates of fresh coal addition and spent coal removal since there will be smaller variations in the height of zone 28a for a given change in the quantity of coal present than in the arrangement of FIG. 1.

The non-illustrated lower portion of the FIG. 3 apparatus could be construed in a similar fashion to the lower illustrated portion of FIG. 1 apparatus. New bed material could be supplied by an overhead conveyor similar to conveyor 32.

FIG. 4 ARRANGEMENT

In the FIG. 4 arrangement, the lower and upper sections 10a and 10b, respectively, of the vessel are joined together by a flexible joint 25 which may be constructed, for example, as a bellows-like member. The essential purpose of sectionalizing the confining vessel is to facilitate the vibration of the coal particles in the upper zone 28 of the bed (see FIG. 2) to improve the compacting action. The flexible joint arrangement of FIG. 4 may be employed either with or without the apparatus 36, 38, 40, 43 and 44 and with or without the spring and flexible mount structures 52, 50—all of which are shown in FIG. 2.

The description has proceeded on the basis of a bed of coal particles for treating liquid sewage and industrial wastes. It will be understood, however, that other bed materials and liquid influents may be employed. Further it is not intended that the invention be limited to the various structural details described, since the invention at least in its broader aspects can be employed with other arrangements and configurations, as comprehended by the attached claims.

What is claimed is:

1. A method of treating a liquid within a vessel, comprising the steps of unidirectionally passing the liquid to be treated from an entrance point adjacent the bottom of the vessel directly upwardly through the lower portion of a confined bed of solid closely packed particles while the solid particles of the bed are moved downwardly, the solid particles providing the only barrier to the upwardly moving liquid, and withdrawing the liquid from the bed before it has reached the region of the bed upper surface so that the region of the bed above the liquid withdrawal point will substantially maintain the bed compacted.

2. The method of claim 1 and further comprising the step of maintaining a bed height above the liquid withdrawal point which is at least two bed diameters.

3. The method of claim 1 and further comprising the step of causing the bed cross sectional area above the liquid withdrawal point to be materially larger than the cross sectional area below the liquid withdrawal point.

4. The method of claim 1 and further comprising the step of vibrating the vessel containing the bed above the liquid withdrawal point to improve compaction of the packed particles.

5. The method of claim 1 and further comprising the step of vibrating only the portion of the vessel containing the bed above the withdrawal point to improve compaction of the packed particles.

6. The method of claim 1 and further comprising the step of replenishing the bed material as its treating usefulness decreases; said replenishing step comprising the component steps of removing spent material from the bed lower surface, and adding new material to the bed upper surface.

7. Liquid treating apparatus comprising a vessel having a liquid treatment bed comprising a confined mass of solid closely packed particles; liquid inlet means, positioned substantially at the bottom of the vessel, operable to feed raw liquid into a lower portion of the bed; and treated liquid outlet means located part way up the height of the bed above said liquid inlet means, the liquid from the inlet means flowing unidirectionally directly upwardly through the bed and out of the bed before reaching the bed upper surface while the solid particles are moved downwardly through the vessel, the region of the bed above the outlet means maintaining the bed substantially compacted.

8. The apparatus of claim 7 wherein the bed height above the liquid outlet means is at least two bed diameters.

9. The apparatus of claim 7 wherein the bed cross sectional area above the liquid outlet means is materially larger than the cross sectional area below the liquid outlet means.

10. The apparatus of claim 7 and further comprising means for compacting said solid particles by vibrating the vessel containing the bed.

11. Liquid treating apparatus according to claim 7, which includes vibratory mechanism for vertically oscillating the vessel containing the treatment bed to compact said bed.

12. Liquid treating apparatus according to claim 7, which includes a discharge valve at the bottom of the bed for releasing a portion of the treatment bed at the lowermost region of the bed.

13. Liquid treating apparatus according to claim 12, which includes means for supplying an additional mass of particles to replace the portion of the bed released through the discharge valve.

14. Liquid treating apparatus according to claim 7, in which the liquid inlet means and the liquid outlet means are composed of perforated chambers.

15. Liquid treating apparatus according to claim 7, which includes means for vertically vibrating the vessel containing the bed to compact the bed, means for discharging the lowermost portion of the bed, and means for supplying additional material to the vessel to replace the discharged portion of the bed.

16. Liquid treating apparatus consisting of a vessel enclosing a liquid treatment bed composed of a confined mass of solid, closely packed particles, said vessel including a stationary lower section and a movable upper section; means for feeding raw liquid to said lower section at a region near the bottom of said lower section and for receiving and discharging treated liquid from the region near the top of the lower section while the solid particles move downwardly through the vessel; and means for vibrating the movable section of the vessel in a vertical direction so as to improve the compaction of the treatment bed.

17. Liquid treating apparatus according to claim 16, in which the stationary and movable sections of the vessel are connected to each other by a flexible joint.

18. Liquid treating apparatus according to claim 11, in which the means for feeding raw liquid and for receiving and discharging treated liquid include annular perforated chambers.

19. Liquid treating apparatus according to claim 18, in which the annular perforated chambers are provided with filtering media.

References Cited

UNITED STATES PATENTS

| | | | |
|---|---|---|---|
| 2,057,887 | 10/1936 | Elliott et al. | 210—268 X |
| 2,744,066 | 1/1956 | Spiess et al. | 210—189 X |
| 2,745,888 | 5/1956 | Mertes et al. | 210—189 X |
| 2,958,655 | 11/1960 | Brown | 210—19 |
| 3,298,791 | 1/1967 | Meyer et al. | 210—189 X |
| 3,378,339 | 4/1968 | Yamashimi. | |

JOHN W. ADEE, Primary Examiner

U.S. Cl. X.R.

210—80, 268, 269, 280